(12) United States Patent
Eriksson

(10) Patent No.: US 6,626,130 B1
(45) Date of Patent: Sep. 30, 2003

(54) METHOD AND APPARATUS FOR CLEANING OF A TEAT CLEANING DEVICE

(75) Inventor: Jan Eriksson, Uttran (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 10/088,244

(22) PCT Filed: Sep. 12, 2000

(86) PCT No.: PCT/SE00/01760
§ 371 (c)(1),
(2), (4) Date: Mar. 15, 2002

(87) PCT Pub. No.: WO01/19174
PCT Pub. Date: Mar. 22, 2001

(30) Foreign Application Priority Data

Sep. 15, 1999 (SE) .............................................. 9903289

(51) Int. Cl.⁷ ............................... A01J 7/02; A01J 7/04
(52) U.S. Cl. ...................... 119/670; 119/652; 119/651
(58) Field of Search ............................ 119/14.1, 670, 119/651, 14.2, 14.08, 14.18, 14.44, 14.47, 604, 652, 612

(56) References Cited

U.S. PATENT DOCUMENTS

| | | | | |
|---|---|---|---|---|
| 3,713,423 A | * | 1/1973 | Sparr, Sr. ..................... | 119/670 |
| 5,101,770 A | * | 4/1992 | Stevenson ................... | 119/651 |
| 5,678,506 A | * | 10/1997 | van der Berg et al. ... | 119/14.18 |
| 5,865,138 A | | 2/1999 | van der Lely ........... | 119/14.02 |
| 6,321,682 B1 | * | 11/2001 | Eriksson et al. ......... | 119/14.44 |
| 6,343,566 B1 | * | 2/2002 | Eriksson ................... | 119/14.01 |
| 6,357,387 B1 | * | 3/2002 | Johannesson ............ | 119/14.47 |
| 6,363,883 B1 | * | 4/2002 | Birk ........................ | 119/14.08 |
| 6,394,038 B1 | * | 5/2002 | Eriksson ..................... | 119/609 |

FOREIGN PATENT DOCUMENTS

| | | | |
|---|---|---|---|
| EP | 0 476 771 A1 | 3/1992 | .......... A01K/13/00 |
| EP | 0 728 412 A1 | 8/1996 | ............ A01J/5/017 |
| WO | WO 99/03331 | 1/1999 | ............ A01J/5/017 |
| WO | WO 99/27775 | 6/1999 | ............ A01J/7/04 |

* cited by examiner

*Primary Examiner*—Charles T. Jordan
*Assistant Examiner*—Kimberly S. Smith
(74) *Attorney, Agent, or Firm*—Boyle Fredrickson Newholm Stein & Gratz S.C.

(57) ABSTRACT

A teat cleaning arrangement (1) for milking equipment, comprising a teat cleaning device (6) with teat cleaning means (23, 41). A milking robot (2) with a robot front end (4) is devised to move the teat cleaning device (6) into engagement with a teat (5), and control means (7) are connectable to the robot (2) for controlling motion thereof. The control means are also connectable to the teat cleaning device (6) for controlling the teat cleaning means (23, 41), and engagement and disengagement with a teat (5). The control means (7) are devised to activate said teat cleaning means (23, 41) to clean said teat cleaning device (6) after each teat disengagement.

20 Claims, 2 Drawing Sheets

US 6,626,130 B1

METHOD AND APPARATUS FOR CLEANING OF A TEAT CLEANING DEVICE

TECHNICAL FIELD

The present invention relates to a device for cleaning teats of a milking animal, and means for cleaning of such devices. The invention also relates to a method of cleaning teat cleaning devices.

BACKGROUND

When dairy animals are to be milked it is necessary to first clean the teats of the animal to avoid dirt present on the teats from contaminating the collected milk. It is also desirable, and even a legal requirement in some countries, to pre-milk the teats. By pre-milking is meant the first phases of milking in which:

the teat is stimulated in order to stimulate the milk ejection reflex and induce milk letdown; and the milking is started and the first drops of milk are collected separately for inspection and/or discarded in order to prevent contaminants on or inside the teat from being transported into the rest of the milking machinery.

During pre-milking it is desirable that the whole of the milk contained in the teat is extracted. This milk can then be inspected for signs of disease or contamination. By inspecting the pre-milk infections, diseases and inflammations, e.g. mastitis, can be detected. Milk that for some reasons is considered to be of insufficient quality must not be mixed with the good milk in the milk cooling tank, and is thus discharged to a milk dump or sewer system.

It is known from EP-A-0 527 509 to use a teat cup containing water to clean the teat and then to use the same teat cup for milking. This requires extremely thorough, time consuming cleaning of the teat cup between the cleaning phase and the milking phase.

EP 0 536 837 discloses an implement of milking animals comprising a cleaning device for teat cleaning. This cleaning devise includes two horizontal spaced apart rollers, which are profiled so as to clean a teat present there between by rotation of the rollers. This cleaning device is, in turn, cleaned between the cleaning of two animals in a second cleaning device. The second cleaning device comprises a box, situated remote from the milking animal, into which box the rollers are inserted. The rollers are rotated against brushes inside the box and are at the same time sprayed with a cleaning fluid. The proposed arrangement makes it difficult to clean two teats of the same animal separately, due to the open structure of the teat cleaning device and the bulky protruding rollers.

PCT/SE98/02224 shows a combined teat cleaning and pre-milking device, having teat cleaning means inside a teat cup. It is not prescribed in the application how to clean the proposed device itself, however.

Milking of dairy animals is performed at least twice a day, and in so called voluntary milky systems perhaps three or four times a day. Even animals that for some reason temporarily are producing milk that is unusable as a dairy product, must be milked. It is hence important to maintain a high quality hygiene in the milking facility. Furthermore, diseases or inflammations such as mastitis does not necessarily relate to all milk from the animal, but only to one teat, or the milk therefrom. Theoretically three quarters of the milk may thus be acceptable. Even though no milk from such an animal is used, due e.g. to legislation, spreading the disease, inflammations, etc. to the other teats of the animal may lead to a prolonged time period, during which the animal does not produce milk of sufficient quality, and thus is not commercially profitable.

OBJECT OF THE INVENTION

It is thus an aspect of the invention to provide a device and a method for teat cleaning with a minimised risk for spreading of infections from one teat to another of the same animal, overcoming the known deficiencies of the prior art. It is further desirable to fulfil this object without the need of any active cleaning means, in addition to the teat cleaning means.

An aspect of this object is to provide the means and methods for minimising the risk for spreading of diseases between teats with minimal time delay on the teat cleaning process.

SUMMARY OF THE INVENTION

The above mentioned objects are fulfilled by a teat cleaning arrangement comprising a teat cleaning device with a teat cleaner or "teat cleaning means," a robot with a robot front end devised to move the teat cleaning device into engagement with a teat, and controls or "control means" connectable to the robot for controlling motion thereof, and to the teat cleaning device for controlling the teat cleaning means, and engagement and disengagement with a teat. According to the invention the control means are devised to activate the teat cleaning means to clean the cleaning device after each teat disengagement.

In a preferred embodiment, the teat cleaning device is a teat cup, also used for pre-milking. The cleaning means preferably comprise a nozzle connected to a cleaning fluid supply, and the nozzle is devised to inject cleaning fluid at high speed, swirling around a teat inserted in the teat cup for cleaning purposes. The same cleaning means and procedure is thus used to clean the teat cup itself when disengaged from a teat, before connection to another teat. In a preferred embodiment a cover is placed closely over a teat receiving opening of the teat cup, when cleaning the teat cup. The cover is designed to direct fluid from the nozzle to the outside of the teat cup, in order to clean any outer surface of the teat cleaning device that has been in contact with the animal.

BRIEF DESCRIPTION OF THE DRAWINGS

The invention will be described more closely by way of examples of embodiments, with references to the accompanying drawings, of which.

DETAILED DESCRIPTION OF PREFERRED EMBODIMENT

Figure 1:
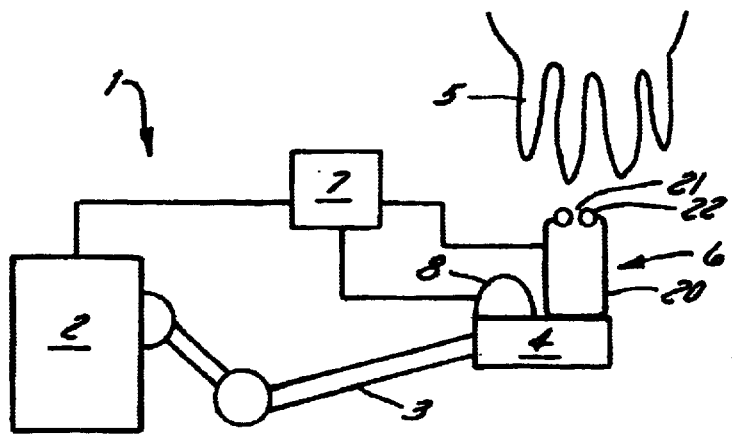
FIG. 1 shows an embodiment of the teat cleaning arrangement according to the invention.

FIG. 1 shows, by means of a schematic illustration, a preferred embodiment of the teat cleaning arrangement 1 according to the invention. The proposed arrangement is a part of a robot milking system, comprising a milking robot 2. In a manner well known for those skilled in the art, the robot 2 uses an arm 3, comprising one or more segments, connected to a front end 4, to maneuver milking equipment in relation to the teats 5 of the animal to be milked. According to the invention, the robot 2 is devised to, inter alia, operate the teat cleaning device 6, which is described in greater detail below. Suitable grabbing means (not shown) arranged in the robot front end 4 are devised to collect the teat cleaning device from a remote storage facility, and to move it into a position under the teats of the animal, which position is shown in FIG. 1. Preferably, all movements and actions of the robot and the teat cleaning device are controlled by a controller 7, which may be a part of the robot 2.

In order for the robot to localise and move in controlled relation to the teats, sensing and positioning means 8 are arranged on the robot front end 4. The sensing and positioning means preferably comprise a light source and a camera, as is well known from the prior art, and is communicatively connected to the controller 7.

According to the invention, the teat cleaning device 6 comprises teat cleaning means. Controller 7 is devised to arrange engagement of the teat cleaning device 6 with a teat 5, and thereafter to perform teat cleaning using the teat cleaning means.

After a predetermined time period, the cleaning procedure is halted, and the cleaning device 6 is disengaged from the teat 5 and is lowered. The controller 7 is then devised to operate the teat cleaning means again for the purpose of cleaning the teat cleaning device 6. The cleaning device 6 is then ready to be attached to another teat 5, and the procedure may be repeated. Preferably, all the teats 5 of the animal are cleaned by this process before attaching milk cups for milking of the animal. During milking, the teat cleaning device 6 is stored away remotely from the animal.

Figure 2:
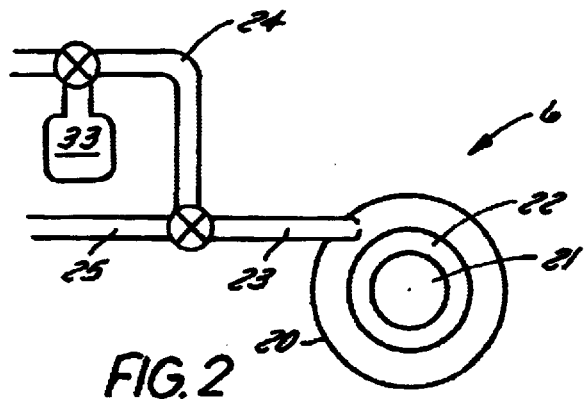
FIGS. 2 and 3 show a first embodiment of a teat cleaning device comprised in the inventive arrangement.
Figure 3:
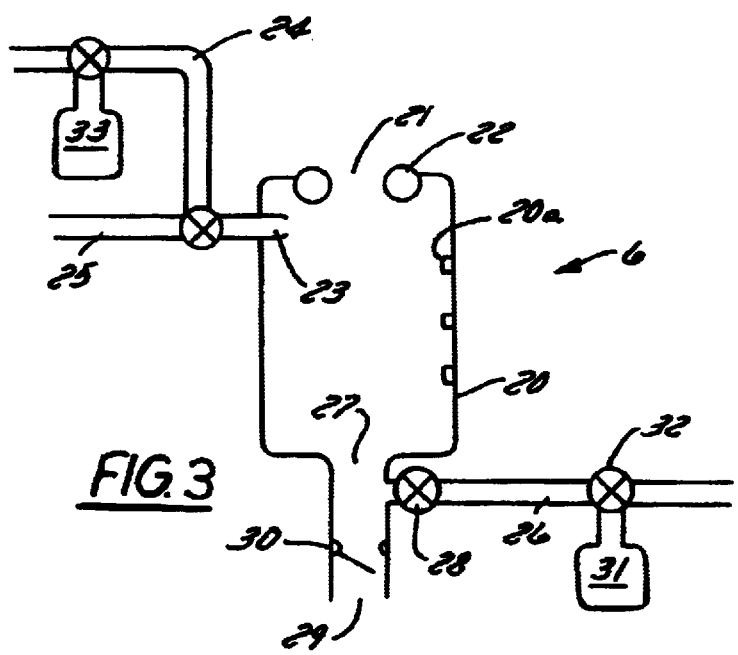

FIGS. 2 and 3 show a preferred embodiment of the teat cleaning device 6, in which parts non-essential for the understanding of its function have been omitted for the sake of clarity.

The teat cleaning device 6 shown in FIGS. 2 and 3 comprises a teat receiving means in the shape of an approximately cylindrical teat cup 20 with a teat receiving opening 21 at its upper end. Teat cup 20 is intended to be placed under the udder of an animal to be milked with opening 21 below a teat 5 which is to be cleaned. Teat cup 20 is then raised so that teat 5 enters the holder through opening 21. Opening 21 has sealing means 22 in the shape of a resilient sealing collar 22 which is in substantially air-tight sealing contact with the udder when teat 5 is fully inserted into teat cup 20. Teat cup 20 has cleaning means 23 in the form of at least one approximately tangential inlet nozzle 23 near to the upper end of the teat cup 20. A cleaning fluid supplying means 24 in the form of a hose 24 connected to a cleaning fluid supply (not shown) and drying air supplying means 25 in the form of a tube 25 connected to an air supply (not shown) can be selectively connected to nozzle 23. A vacuum supplying means 26 in the form of a non-collapsible pipe 26, connected to a vacuum supply (not shown), is connected to an outlet opening 27 in the base of teat cup 20 via a valve means.

A teat is cleaned by being inserted into teat cup 20 and sprayed by high speed cleaning fluid ejected from nozzle 23. The impact of the fluid on the circular inner wall of the teat cup 20 produces vortices, which clean the teat due to their turbulent motion. This turbulent motion, and consequential cleaning effect, can be increased and adjusted, for example, by pulsating the fluid flow, injecting air into the fluid flow, applying a vacuum to the teat cup, and/or disturbing the flow by means of protuberances 20a on the inner wall. In by air inlets (not shown) positioned for this purpose on the wall. Furthermore it is possible for some or all of the cleaning fluid to be directed to impact tangentially on the teat. Combinations of the abovementioned turbulence inducing means are naturally also conceivable.

The cleaning fluid leaves the teat cup 20 via outlet opening 27 which has an outlet 29 with a non-return valve 30 which permits the cleaning water to drain away either to a sewage system or to a storage system for possible examination and recycling. Preferably the draining of the cleaning fluid from the teat cup 20 is assisted by a vacuum (not shown) applied to the outlet 29. Using a vacuum also causes the teat to expand which cracks and loosens any dried-on matter on the teat. This makes it easier to remove the dried-on matter during the cleaning process.

After cleaning, teat 5 is dried by air blown into the teat cup 20 from the drying air supplying means 25. After passing teat 5, the air can leave the teat cup 20 through outlet 27.

Preferably after drying teat 5 can be pre-milked. This is achieved by producing an under-pressure in teat cup 20 by opening vacuum supply valve 28. This under-pressure is chosen to be sufficient to overcome the muscle pressure holding closed the milk canal which leads from the teat milk cavity to the tip of teat 5. This causes the milk canal to open and the pre-milk contained in the milk cavity to flow to the tip. This milk is sucked through opening 27 and into the vacuum supply pipe 26. This supply pipe 26 leads to a collector vessel 31 which collects the pre-milk which can then be examined for the presence of contaminants, such as dirt, feces, blood, etc. and signs of infection, e.g. pus, blood, bacteria, antibodies, etc. The vacuum is applied for a time sufficiently long to ensure that the teat is completely emptied of pre-milk. The time can be determined for example by experiment or by using fluid sensing means which detect the presence or absence of milk in the vacuum pipe.

After the pre-milk has been collected the teat cup 20 can be removed from the teat. Collector vessel 31 can have an inlet valve 32 which can be used to close the inlet of the vessel 31 after the pre-milk has been collected. This permits the vacuum supply pipe 26 to be cleaned by, for example, supplying cleaning fluid to the teat cup 20 at the same time as a vacuum is applied.

While the above embodiment has been illustrated with only one tangential inlet nozzle it is of course possible to provide other nozzle orientations in order to ensure adequate cleaning. The cleaning effect can also be enhanced by providing the teat cup with internal flexible bristles which can be made to brush the teat under the influence of the fluid flowing in the teat cup.

It is conceivable that the teat receiving opening sealing means of the present invention could be an inflatable collar or a series of collars or any other suitable sealing means.

Figure 4:
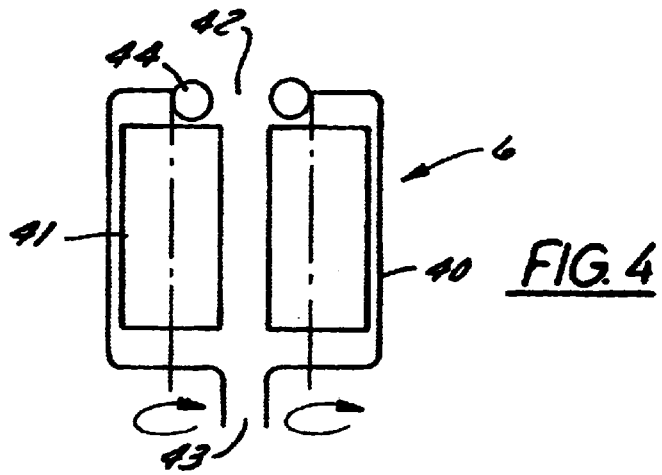
FIG. 4 shows a second embodiment of a teat cleaning device comprised in the inventive arrangement.

In another embodiment of the teat cleaning device, shown in FIG. 4, the cleaning means also includes mechanical cleaning elements 41 arranged in the teat cup 40. In the shown embodiment vertically arranged brush-rollers 41 are disposed annularly around the teat receiving opening 42. This is only briefly illustrated in the figure, in which details similar or corresponding to those illustrated in FIGS. 2 and 3, such as cleaning fluid supply means 23, 24 and drying means 25, have been left out for the sake of clarity. The brushes 41 are each orientated with their longitudinal axis substantially perpendicular to the plane of upper end of the cup and are arranged in a circle with a central space able to receive a teat. The brushes 41 are rotatably mounted in the cup 40 and can be rotated by driving means (not shown). There are preferably an even number of brushes 41 and preferably each brush 41 rotates in the opposite direction to its neighbouring brushes 41 in order to prevent twisting of the teat. To prevent an exceptionally narrow teat being drawn into the space between two brushes 41 and possibly damaged by squeezing, barrier means can be provided between the brushes. These barrier means may consist of vertically projecting rods which are fixed to the holder cup in the areas between the brushes. These rods are preferably extend a distance equal to the distance between the base of the cup to its top and are substantially parallel to the axes of the brushes 41. A teat 5 is cleaned by first being fully inserted into the cup 40 and then by being brushed by rotating brushes 41, preferably while cleaning fluid is supplied.

After cleaning teat 5 is dried by air blown into the teat cup 40. After passing teat 5 the air can leave the holder 3 through outlet 43. During drying the brushes 41 can continue to rotate in order to dry them. The cleaning fluid used may of course be water, but may also contain, to some degree, a sterilising fluid or a detergent, provided from a vessel 33.

Figure 5:
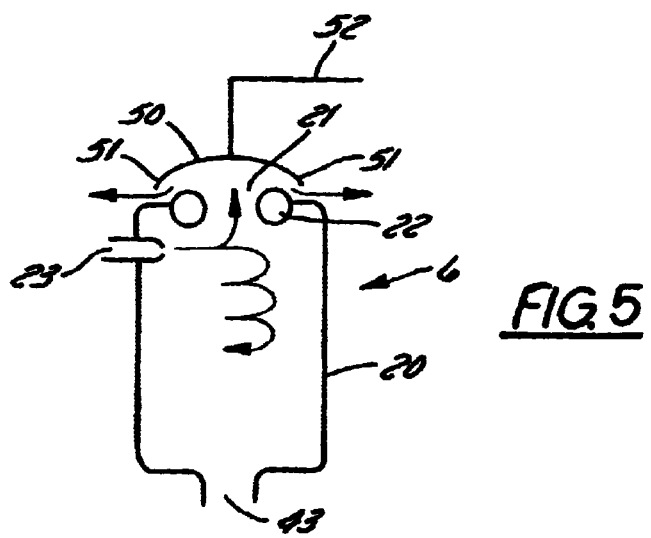
FIG. 5 shows the device of FIGS. 2 and 3 in conjunction with a cleaning cover.

According to the invention, the same cleaning means 23, 41 are used both for cleaning teats and for cleaning the teat cleaning device 6 itself. The latter may be performed between cleaning of two teats of the same animal, at a position just under the udder. In a preferred embodiment of the invention, the teat cleaning arrangement 1 further comprises a cover for improving the cleaning of the teat cleaning device 6. This is illustrated in FIG. 5 for a teat cleaning device according to FIGS. 2 and 3. During cleaning of the cleaning device 6, the cover 50 is positioned just above the teat receiving opening 21. The cover 50 is devised with downwards projecting edges 51, and in the exemplary figure realised by a concave bottom surface of the cover 50. Due to this form, cleaning fluid supplied by nozzle 23 at high speed will be directed towards the outer portions of the collar 22, cleaning it from any possible running dirt, bacteria, etc. Other shapes of the cover can be thought of, of course, having the same effect on the cleaning fluid flow. The cover 50 is preferably supported by means 52 that is foldable or pivotable in relation to the teat cup 20 of the teat cleaning device 6. When cleaning of the teat cup 20 is to begin, the cover 50 is brought into position over the teat receiving opening 21, and after completed cleaning, the cover 50 is once again removed. The mobile supporting means 52 are preferably mechanically fixed to the exterior of the teat cup 20, or to the robot front end 4.

Figure 6:
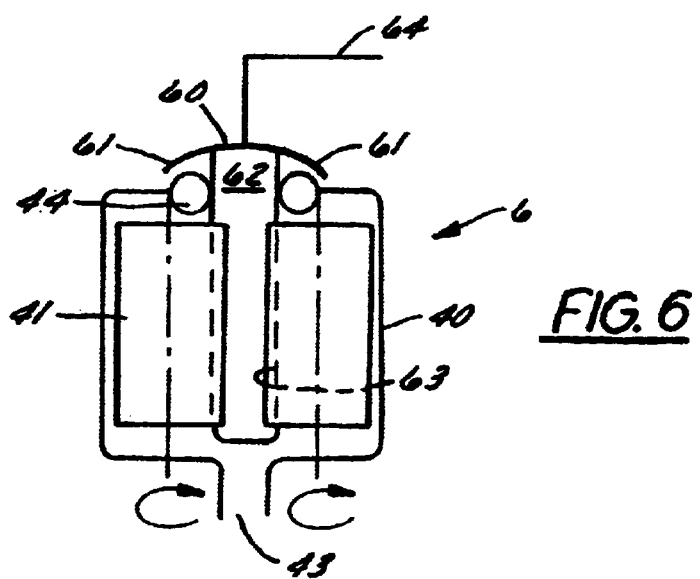
FIG. 6 shows the device of FIG. 4 in conjunction with a cleaning cover.

FIG. 6 shows a corresponding cover 60 for a teat cleaning device 6 embodied as in FIG. 4. The cover 60 comprises, apart from downwards projecting edges 61, a protruding member 62 having equally many radially extruding edges 63 as the number of rollers 41. The supporting means 64 is preferably rotationally stiff, so that insertion of the protruding member 62 in the teat receiving opening 42 always occurs with the edges 63 engaging one roller 41 each. When rotating rollers 41 during cleaning of the teat cup 40, the brushes of the rollers are cleaned by brushing against the edges 63. The edges 61 work in the same manner as described in conjunction with FIG. 5.

Common for the covers 50 and 60 is that they are both passive elements, and the cleaning of the teat cleaning device 6 is performed by the teat cleaning means 23, 41 themselves. In a simple embodiment of the invention, the cleaning of the teat cleaning device 6 is performed completely without the use of any cover 50 or 60.

In the context of the present invention the "milking animal" may of course be a cow. However, any other milking animal, such as a sheep, goat, horse of buffalo, may also be intended.

What is claimed is:

1. A teat cleaning arrangement comprising a teat cleaning device with teat cleaning means, a robot with a robot front end devised to move the teat cleaning device into engagement with a first teat of a dairy animal, and control means connectable to the robot for controlling motion thereof, and connectable to the teat cleaning device for controlling the teat cleaning means, and for engagement and disengagement with said first teat, said control means being devised to activate said teat cleaning means to clean said teat cleaning device after disengagement from said first teat and before engagement with a second teat of said dairy animal.

2. The teat cleaning arrangement as recited in claim 1, in which the teat cleaning device comprises a housing with an annular cross-section that has a teat receiving opening arranged in an upper end of the housing and a fluid discharge opening at an opposing end.

3. The teat cleaning arrangement as recited in claim 2, in which the teat receiving opening is provided with sealing means comprising a resilient collar.

4. The teat cleaning arrangement as recited in claim 2, in which the teat receiving opening is provided with sealing means comprising an inflatable collar.

5. The teat cleaning arrangement as recited in claim 2, in which the teat cleaning means comprises a nozzle, connectable to cleaning fluid supply means and to air supply means, which nozzle is arranged with its output in an essentially tangential direction relative said annular cross-section, inside said housing.

6. The teat cleaning arrangement as recited in claim 5, further comprising sensing and positioning means, arranged on said robot front end, communicatively connected to said control means, for teat localisation, engagement and disengagement.

7. The teat cleaning arrangement as recited in claim 6, wherein said teat cleaning device is provided with a vacuum supply means communicatively coupled to the inside of said housing connectable to a vacuum source.

8. The teat cleaning arrangement as recited in claim 6, devised to inject fluid at high speed through said nozzle when a teat is present in the housing of said cleaning device, for the purpose of cleaning said teat, and further devised to inject fluid at high speed through said nozzle when no teat is present in the housing, for the purpose of cleaning said cleaning device.

9. The teat cleaning arrangement as recited in claim 8, further comprising a cleaning cover supported by said robot front end, and means for positioning said cover closely over the teat receiving opening for the purpose of directing fluid, injected from said nozzle during cleaning of the cleaning device, to the exterior of the teat cleaning device.

10. The teat cleaning arrangement as recited in claim 2, in which the teat cleaning means further comprises a plurality of cleaning rollers, rotatably supported inside the housing essentially parallel to and evenly distributed around a centre axis of said housing, and means for rotating said rollers.

11. The teat cleaning arrangement as recited in claim 2, in which said fluid discharge opening is connectable to a pre-milk collector vessel.

12. The teat cleaning arrangement as recited in claim 11, wherein said teat cleaning means discharges a cleaning fluid comprising water.

13. The teat cleaning arrangement as recited in claim 11, wherein said teat cleaning means discharges a cleaning fluid comprising a detergent.

14. A method of cleaning a teat cleaning arrangement, comprising:
   providing a teat cleaning device with teat cleaning means, a robot with a robot front end devised to move the teat cleaning device into engagement with a first teat of a dairy animal, and control means connectable to the robot and to the teat cleaning device, for cleaning said teat cleaning device;
   engaging said teat cleaning device with said first teat;
   cleaning the first teat using said cleaning means;
   disengaging said teat cleaning device from the first teat;
   cleaning the teat cleaning device using said cleaning means;
   engaging said teat cleaning device with a second teat of the same dairy animal.

15. The method as recited in claim 14, comprising the step of pre-milk said teat between engagement therewith and cleaning thereof, using the teat cleaning device.

16. The method as recited in claim 15, in which the engaging and cleaning steps comprise:
   receiving the teat in a teat receiving opening in the teat cleaning device;
   supplying a cleaning fluid at high speed to a nozzle of the cleaning device, and flushing said cleaning fluid around said teat for cleaning purposes;
   supplying a dry gas to a nozzle of the cleaning device, and blowing said gas around the teat for drying purposes.

17. The method as recited in claim 16, further comprising the step of supplying a vacuum to a fluid discharge opening of the cleaning device when engaged with a teat, thereby causing the teat to expand.

18. The method as recited in claim 17, wherein cleaning of the teat cleaning device further comprises:
   bringing the teat receiving opening of the cleaning device and a cleaning cover closely together; and
   directing fluid, injected from said nozzle during cleaning of the cleaning device, to the exterior of the teat receiving device, by means of said cover.

19. A teat cleaning apparatus comprising:
   a teat cup that has an interior, an exterior, and a teat receiving opening for receiving a teat of a milking animal,
   a nozzle carried by the teat cup that discharges cleaning fluid into the interior of the cup during cleaning of a teat of a milking animal that has been inserted through the teat receiving opening and during cleaning of the teat cleaning apparatus, and
   a cover that overlies the teat receiving opening in the teat cup during cleaning of the teat cleaning apparatus and that distributes a portion of the cleaning fluid discharged from the nozzle during cleaning of the teat cleaning apparatus onto the exterior of the teat cup.

20. The teat cleaning apparatus as recited in claim 19 further comprising a brush disposed inside of the cup and a seal disposed in the teat receiving opening, wherein the cup has a second opening through which a vacuum is capable of being applied, and wherein the nozzle is disposed generally tangential to the interior of the cup.

* * * * *